United States Patent
Deng et al.

(10) Patent No.: US 7,653,924 B1
(45) Date of Patent: Jan. 26, 2010

(54) DIGITAL VIDEO STREAMING OVER OPTICAL NETWORK

(75) Inventors: Yu Deng, Milpitas, CA (US); Sharat Prasad, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 1008 days.

(21) Appl. No.: 10/676,708

(22) Filed: Oct. 1, 2003

(51) Int. Cl.
*H04N 7/10* (2006.01)

(52) U.S. Cl. .................. 725/36; 725/82; 725/114; 725/116; 725/138; 370/503; 370/509

(58) Field of Classification Search ................ 725/129, 725/36, 82, 114–118, 138; 370/503, 509; 348/565, 584
See application file for complete search history.

(56) References Cited

U.S. PATENT DOCUMENTS

| | | | | |
|---|---|---|---|---|
| 5,444,711 | A | 8/1995 | Mizuguchi et al. | 370/99 |
| 5,805,764 | A * | 9/1998 | Noritomi | 386/96 |
| 5,818,511 | A | 10/1998 | Farry et al. | 348/7 |
| 5,917,815 | A | 6/1999 | Byers et al. | 370/352 |
| 6,049,539 | A * | 4/2000 | Lee et al. | 370/355 |
| 6,148,135 | A * | 11/2000 | Suzuki | 386/12 |
| 6,154,772 | A * | 11/2000 | Dunn et al. | 725/114 |
| 6,259,481 | B1 * | 7/2001 | Fimoff et al. | 348/456 |
| 6,363,073 | B2 * | 3/2002 | Nichols | 370/395.62 |
| 6,483,547 | B1 * | 11/2002 | Eyer | 348/473 |
| 6,493,872 | B1 * | 12/2002 | Rangan et al. | 725/32 |
| 6,519,773 | B1 | 2/2003 | Ahmed et al. | 725/118 |
| 6,661,422 | B1 * | 12/2003 | Valmiki et al. | 345/530 |
| 6,674,460 | B1 * | 1/2004 | Pocock et al. | 348/24 |
| 6,934,301 | B2 * | 8/2005 | Jordan | 370/466 |
| 7,177,314 | B2 * | 2/2007 | Wu et al. | 370/395.51 |
| 7,333,153 | B2 * | 2/2008 | Hartson et al. | 348/608 |
| 7,370,342 | B2 * | 5/2008 | Ismail et al. | 725/46 |
| 7,508,846 | B2 * | 3/2009 | Peng | 370/536 |
| 2001/0023436 | A1 * | 9/2001 | Srinivasan et al. | 709/219 |
| 2001/0037376 | A1 * | 11/2001 | Ullman et al. | 709/218 |
| 2002/0019987 | A1 * | 2/2002 | James et al. | 725/136 |
| 2002/0090007 | A1 * | 7/2002 | Kamiya et al. | 370/476 |
| 2002/0164149 | A1 * | 11/2002 | Wilkinson | 386/46 |
| 2003/0076558 | A1 * | 4/2003 | Raman et al. | 359/119 |
| 2003/0081619 | A1 | 5/2003 | Phillips et al. | 370/400 |
| 2004/0070688 | A1 * | 4/2004 | Bazarsky et al. | 348/469 |
| 2004/0100958 | A1 * | 5/2004 | Peng | 370/392 |
| 2004/0264468 | A1 * | 12/2004 | Horton et al. | 370/392 |
| 2006/0007355 | A1 * | 1/2006 | Shau | 348/473 |

FOREIGN PATENT DOCUMENTS

EP     0902590 A2 *   3/1999

OTHER PUBLICATIONS

An Overview of ITU-T G.709; Agilent Technologies; p. 2; Printed in USA Sep. 1, 2001.*

(Continued)

*Primary Examiner*—Annan Q Shang (57) ABSTRACT

Systems and methods for carrying a serial digital video stream over an optical network such as an optical network employing SONET/SDH or G.709. For example, serial digital video data formatted in accordance with ANSI/SMPTE 259 M-1997 may be carried. Also, a common interface may be provided for both serial digital video streams and packetized digital video data such as DVB-ASI data.

39 Claims, 5 Drawing Sheets

OTHER PUBLICATIONS

Generic Framing Procedure ITU-T G.7041; Agilent Technologies; pp. 8-10; Printed in USA Jul. 23, 2002.*

Joint Impact of MPEG-2 Encoding Rate and ATM Cell Losses on Video Quality; Oliver Verscheure, Pascal Frossard, and Maher Hamdi; Section 2—MPEG-2 over Packet Networks; Printed in IEEE in 1998.*

Scalable SONET/SDH Bandwidth White Paper; Agilent Technologies; pp. 2-4; Copyrighted Dec. 20, 2001.*

Clock Recovery for Circuit Emulation Services over ATM, Castel-Branco, Luis and Nunes, Mario Serafim, Appears in: Broadband Communications, 1996, Global Infrastructure for the Information Age. Proceedings of the International IFIP-IEEE Conference on.*

Grobe et al., Optical metropolitan DWDM networks—an overview, Oct. 2002, vol. 20 No. 4.*

Safar, Mapping SMPTE 259 into ATM structure, May 15, 2001. http://www.videoservicesforum.org/download/vsfmeetings/Safar%20on%200501.pdf.*

SMPTE Standard for Television SMPTE 305.2M-2000, "Serial Data Transport Interface (SDTI)," Society of Motion Picture and Television Engineers, Oct. 10, 2000, 14 pages.

SMPTE Standard for Television ANSI/SMPTE 259M-1997, "10-Bit 4:2:2 Component and $4f_{sc}$ Composite Digital Signals-Serial Digital Interface," Society of Motion Picture and Television Engineers, Sep. 25, 1997, 8 pages.

ITU-T Standard G.7041/Y.1303, "Generic Framing Procedure (GFP)," International Telecommunication Union, Dec. 2001, 52 pages.

* cited by examiner

DIGITAL VIDEO STREAMING OVER OPTICAL NETWORK

BACKGROUND OF THE INVENTION

The present invention relates to data networking and more particularly in some embodiments to distribution of digital video.

Optical network technologies have greatly increased the data-carrying capacities of networks. Optical signals carrying 10 Gbps data streams are prevalent and widespread usage of 40 Gbps signals is envisioned. By employing wavelength division multiplexing (WDM) techniques numerous such optical signals may be combined on the same fiber, further increasing overall data-carrying capacity.

To optimally exploit capabilities of high data rate optical networks, hierarchical digital transmission standards such as SONET, SDH, and G.709 have been developed. These standards facilitate the time domain multiplexing of lower data rate services into a very high data rate optical signal. They also provide features such as timing coordination among network nodes, administration and management functions, etc. These standards readily accommodate digital telephony services, ATM traffic, and layer 3 packets such as IP packets.

Another type of data service that would benefit from the use of the above-mentioned modern optical networking technologies is digital streaming video. Major broadcast networks employ the ANSI 4/SMPTE 259 M-1997 serial digital interface (SDI) standard to distribute digital video. This standard is only one example of a serial digital video standard. For example, there are also higher data rate counterparts that provide high definition digital video streams. Systems and methods have already been developed for handling packetized digital video, for example DVB-ASI packets, in the context of the above-mentioned hierarchical digital transmission standards. Systems and methods for extending these methods to accommodate serial digital video are needed.

SUMMARY OF THE INVENTION

Embodiments of the present invention provide systems and methods for carrying a serial digital video stream over an optical network such as an optical network employing SONET/SDH or G.709. For example, serial digital video data formatted in accordance with ANSI/SMPTE 259 M-1997 may be carried. Also, a common interface may be provided for both serial digital video streams and packetized digital video data such as DVB-ASI data.

A first aspect of the present invention provides a method for transmitting a serial video data stream by employing a hierarchical digital transmission standard. The method includes: segmenting the serial video data stream into a sequence of horizontal scan lines, encapsulating the horizontal scan lines within GFP packets, and mapping the GFP packets into a digital signal in accordance with the hierarchical digital transmission standard.

A second aspect of the present invention provides a method for receiving a serial video data stream by employing a hierarchical digital transmission standard. The method includes: demapping GFP frames from a signal formatted in accordance with the hierarchical digital transmission standard and deencapsulating the GFP frames to extract horizontal scan lines of the serial video data stream.

A third aspect of the present invention provides apparatus for transmitting a serial video data stream by employing a hierarchical digital transmission standard. The apparatus includes: a scan line delineation block that segments the serial video data stream into a sequence of horizontal scan lines and a mapper that encapsulates the horizontal scan lines within GFP packets and maps the GFP packets into a digital signal in accordance with the hierarchical digital transmission standard.

A fourth aspect of the present invention provides apparatus for receiving a serial video data stream via a hierarchical digital transmission standard. The apparatus includes: a demapper that demaps GFP frames from a signal formatted in accordance with the hierarchical digital transmission standard and deencapsulates the GFP frames to extract horizontal scan lines of the serial video data stream and a clock recovery system that recovers timing of the serial video stream.

A fifth aspect of the present invention provides apparatus for transmitting digital video information employing a hierarchical digital transmission standard. The apparatus includes: a video interface configured to receive one of a serial digital video stream and a DVB-ASI packet stream; and a mapper that maps GFP packets that include data from either the digital video stream or the DVB-ASI packet stream into a digital signal in accordance with the digital transmission standard. In a first mode the video interface receives the serial digital video data stream and the GFP packets include digital video data. In a second mode the video interface receives DVB-ASI packets and the GFP packets include data from the DVB-ASI packet stream.

Further understanding of the nature and advantages of the inventions herein may be realized by reference to the remaining portions of the specification and the attached drawings.

DESCRIPTION OF SPECIFIC EMBODIMENTS

Embodiments of the present invention will be described with reference to a representative application where a serial digital video data stream or a series of DVB-ASI packets is to be carried via a SONET network. It will be appreciated, however, that this application is merely representative. The same or similar techniques will apply to other hierarchical digital transmission standards such as SDH and G.709. Also, other variants of serialized and/or packetized digital video can readily be accommodated.

Figure 1:
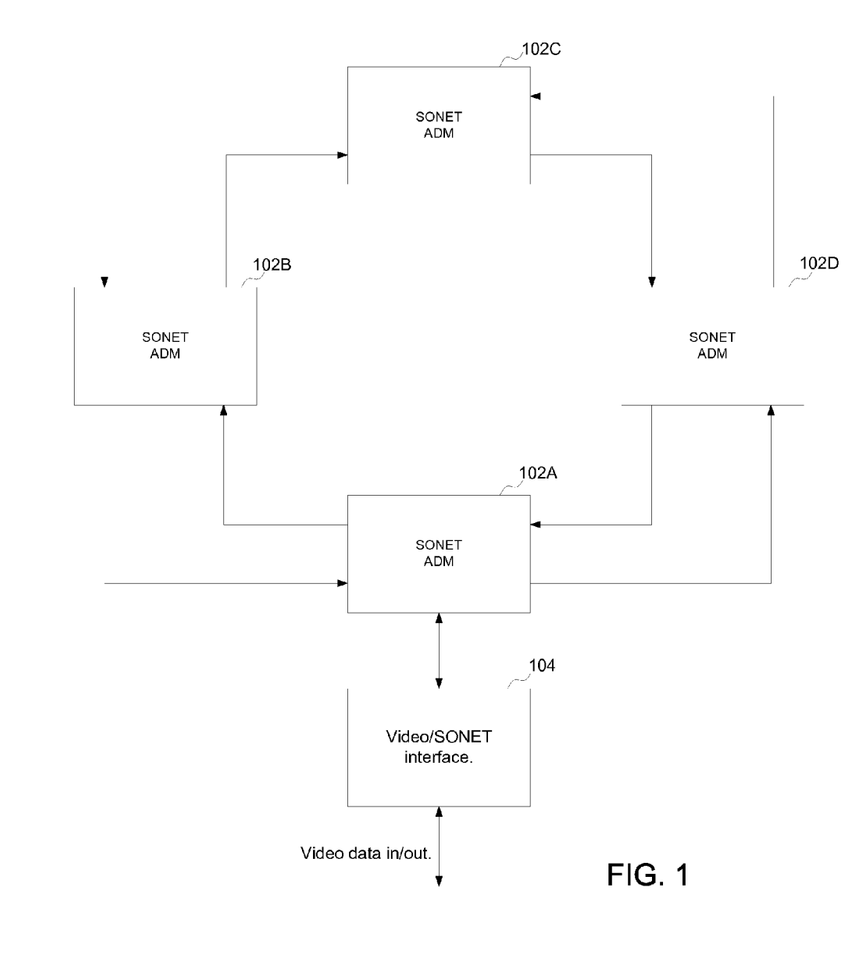
FIG. 1 depicts a SONET network configured to carry serial digital video data according to one embodiment of the present invention.

FIG. 1 depicts a SONET network 100 adapted to carry digital video data according to one embodiment of the present invention. Four SONET add/drop multiplexers (ADMs) 102A-102D are connected together in a bi-directional ring configuration. Each ADM may be an ONS-15454 available from Cisco Systems of San Jose, Calif. The ring configuration and equipment type are of course only particular features of one example. A 10 Gbps signal (OC-192) signal is carried around the ring with various payload constituents being added and dropped by the ADMs 102A-102D. This data rate is also merely representative. By use of appropriate wavelength multiplexers and demultiplexers (not shown), multiple such signals may be carried by the same optical fiber.

According to one embodiment of the present invention, a digital video signal may be carried within a SONET signal circulating around the ring. The digital video signal may have a data rate of approximately 270 Mbps to accommodate a very high quality uncompressed digital video feed. Reliable SONET transport of the digital video data would require the equivalent of six STS-1 (51.840 Mbps) SONET signals. Accordingly, in one implementation, digital video data is mapped into a VC-3-6v SONET virtual concatenation that includes six STS-1 payloads. The equivalent SDH nomenclature is a VT3-6v virtual concatenation.

In FIG. 1, one of the SONET ADMs 102A is equipped with a video/SONET interface 104 that can either remove or insert a digital video signal to or from the SONET signal flowing through one of SONET ADMs 102A. According to one embodiment of the present invention, the digital video signal may be either a serial digital video data stream or a stream of digital video packets.

An example of a digital video data stream standard is the ANSI/SMPTE 259 M-1997 standard published in 1997 by the Society of Motion Picture and Television Engineers, the contents of which are herein incorporated by reference in their entirety for all purposes. The standard is used for video production and distribution and is herein referred to as Serial Digital Interface (SDI). Another example of a digital video data distribution is the SMPTE 305.2M-2000 standard published in 2000, the contents of which are herein incorporated by reference in their entirety for all purposes. This standard is intended for packetized video distribution and is herein after referred to as Serial Data Transport Interface (SDTI). Embodiments of the present invention can also accommodate high definition counterparts to the SDI and SDTI standard by using a higher capacity virtual concatenation.

This is of course only one example of a serial digital video standard. A higher definition digital video data stream may be accommodated by employing a higher data rate virtual concatenation. An example of a packetized digital video stream is the DVB-ASI standard as described in DVB Document A010 rev. 1, May 1999, the contents of which are herein incorporated by reference in their entirety for all purposes. The DVB-ASI standard encodes digital video data using the MPEG standard and encapsulates the encoded result in packet form.

The generic framing procedure (GFP) specified by ITU-T Recommendation G.7041/Y.1303, the contents of which are herein incorporated by reference in their entirety for all purposes, is used to encapsulate digital video data for subsequent transport over the SONET network. GFP provides a frame mode, GFP-F, that is used for transporting packets or frames specified by a higher level protocol over a SONET/SDH or G.709 network. GFP further provides a transparent mode, GFP-T, that is used to transfer data that has not been previously formatted into packets or frames. GFP-T employs fixed length GFP-T frames for carrying such data.

Embodiments of the present invention employ GFP-T to transport DVB-ASI and other packetized video data. SDI and SDTI employ an encapsulation procedure that is similar to GFP-F but not exactly the same. SDI and SDTI scan lines are encapsulated but, unlike in GFP-F, every bit is transported.

Figure 5:
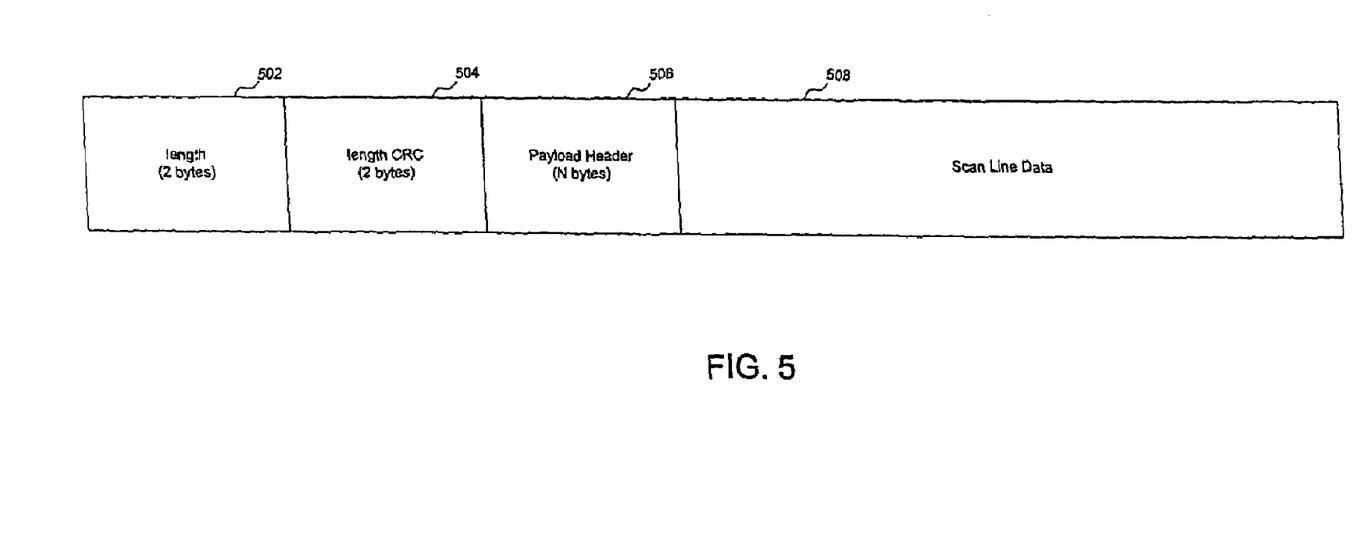
FIG. 5 depicts a frame structure useful in carrying serial digital video data according to one embodiment of the present invention.

FIG. 5 illustrates the frame structure used for digital video data according to one embodiment of the present invention. In the frame format of FIG. 5, each frame preferably encapsulates a single horizontal scan line of video data. In an alternative embodiment, multiple packets may be used for a horizontal scan line. For example, multiple packets per scan line may be used when a higher data rate video signal such as a high definition digital video data stream is being encapsulated. In FIG. 5, a length field 502 gives the overall length of the GFP frame. A length CRC field 504 provides a cyclic recovery check to allow detection and/or correction of errors of the length field 502. A payload header field 506 includes N bytes of payload header where N is provisionable. A payload field 508 holds the horizontal scan line data.

In one exemplary implementation, payload header field 506 contains a two byte time-stamp counter value that is used to recover the transmit side video client clock on the receive side plus a two byte CRC field. In this example, there is one horizontal scan line per frame and payload data field 508 holds 858 pixels where each pixel is specified by two 10b/8b encoded bytes. There are thus 2145 bytes in payload data field 508 and a total of 2153 bytes in the entire GFP frame. The entire mapping mechanism thus adds only 8 bytes of overhead to the 2145 bytes of the digital video data, less than 0.5% overhead. Due to the use of this framing structure, embodiments of the present invention may remove EAV and SAV framing bytes that SDI employs to delineate horizontal scan lines that identify horizontal blanking intervals. This would reduce the byte total.

Figure 2:
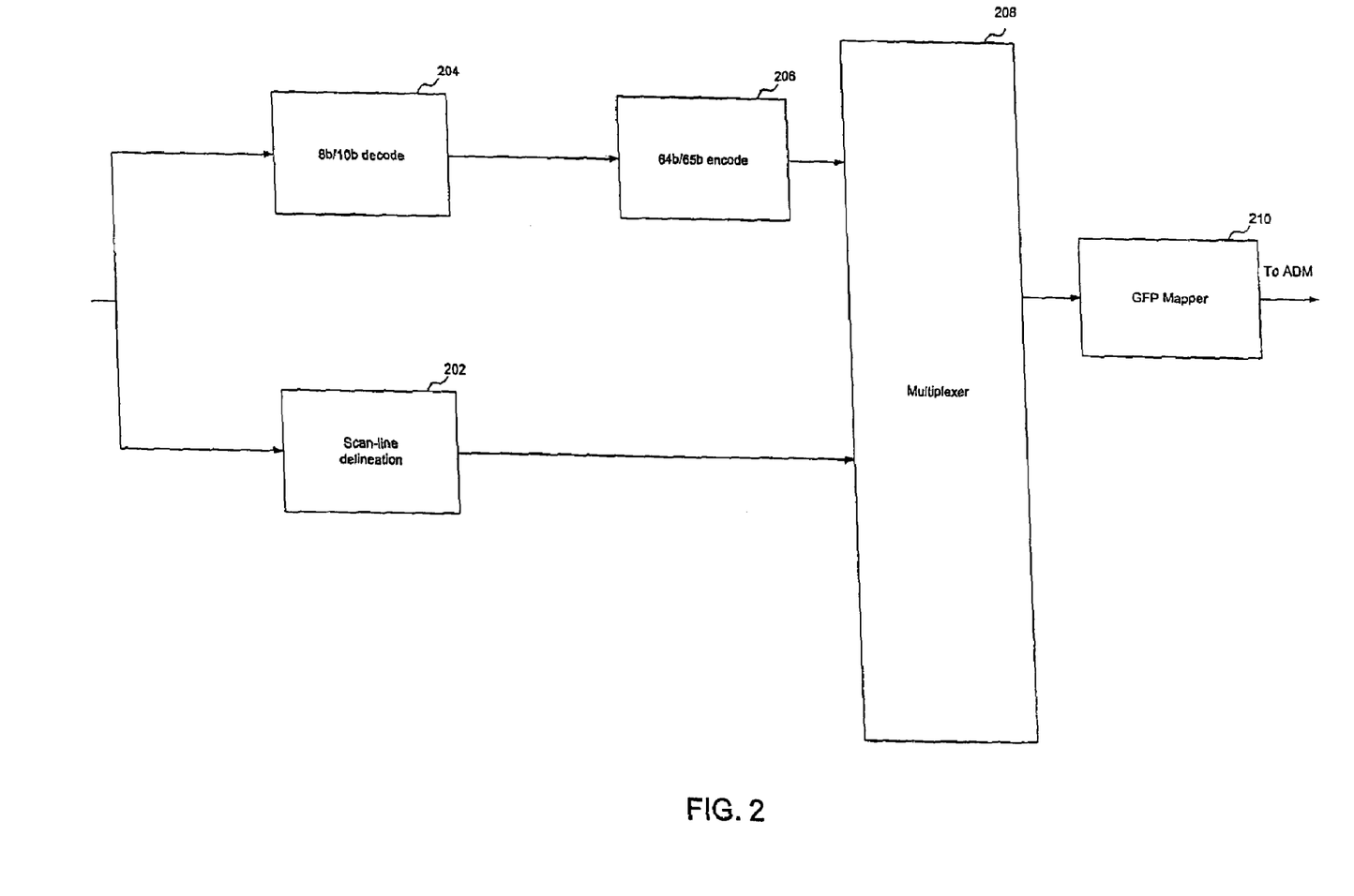
FIG. 2 depicts the transmit side of a digital video interface according to one embodiment of the present invention.

FIG. 2 depicts the transmit side of video/SONET interface 104 according to one embodiment of the present invention. This embodiment can handle either DVB-ASI signals or SDI signals. There are two processing chains. One processing chain is active for DVB-ASI signals and the other processing chain is active for SDI signals. For SDI signals, the first processing stage is a scan-line delineation block 202. Scan-line delineation block 202 identifies individual horizontal scan lines in the serial digital video data stream by looking for the appropriate values of the EAV and SAV framing bytes specified by the standard. Scan-line delineation block 202 also computes the time-stamp counter and payload header CRC value. DVB-ASI data is instead transferred to an 8b/10b decode block 204 which is active in the DVB-ASI mode. 8b/10b decode block 204 removes the 8b/10b encoding of the DVB-ASI packet stream. A 64b/65b encode block 206 receives the decoded output of block 204 and generates 64b/65b encoded superblocks as defined by the G.7041 GFP-T standard.

A multiplexer block 208 selects from the output of 64b/65b encode block 206 and scan-line delineation block 202 based on the current operating mode of video/SONET interface 104. The selected data stream is forwarded to a GFP mapper 210. GFP mapper 210 computes the appropriate values for length field 502 and length CRC field 504 of the GFP frame structure. GFP mapper 210 formats the packets for inclusion in the appropriate virtual container and forwarding to the ADM. For the SDI data, during blanking periods when there are no pixels being generated, GFP mapper 210 inserts GFP idle frames.

Figure 3:
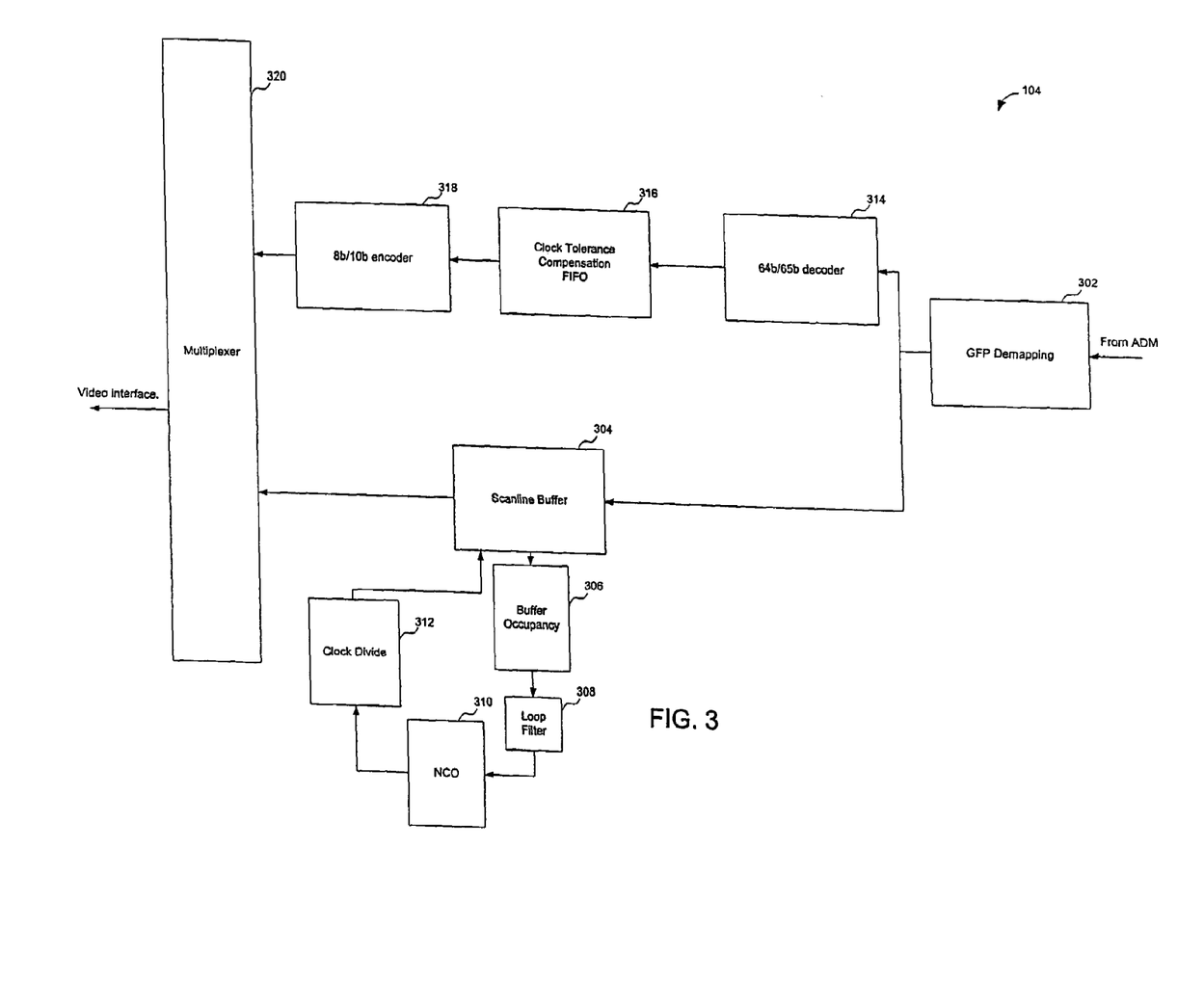
FIG. 3 depicts the receive side of a digital video interface according to one embodiment of the present invention.

FIG. 3 depicts the receive side of video/SONET interface 104 according to one embodiment of the present invention. Data from the allocated virtual concatenation is forwarded from the ADM to a GFP demapping block 302. GFP demapping block 302 removes the virtual concatenation and GFP encapsulations as well as the payload data header. GFP mapping block 302 also removes idle frames and reinserts EAV and SAV framing bytes if these were removed at the transmit end. In the serial data mode, a scan line buffer 304 buffers the pixel data. Scan line buffer 304 can hold approximately one horizontal scan line of data.

Data flow into scan line buffer 304 may be bursty and it is desirable to clock data out of scan line buffer 304 at a steady video rate. Accordingly, there is a phase lock loop (PLL) that is used to control the output clock of scan line buffer 304. A buffer occupancy block 306 measures the occupancy percentage of scan line buffer 304. The buffer occupancy figure is scaled and filtered in the time domain by a loop filter 308. The output of loop filter 308 control the frequency of a numerically controlled oscillator (NCO) 310. The output of NCO 310 is fed to a clock divide block 312. The output of clock divide block 312 is then used to control the release of data from scan line buffer 304.

During the DVB-ASI operation mode, demapped video data from GFP demapping block 302 is fed to a 64b/65b decoder 314 which removes the 64b/65b encoding from the GFP-T superblocks. This decoded data is fed to a clock tolerance compensation FIFO 316. Clock tolerance compensation FIFO 316 performs a buffering role analogous to scan line buffer 304. To regulate the output of video data, FIFO 316 inserts or drops comma characters as defined by the 8b/10b encoding scheme as appropriate. The video data output by FIFO 316 is 8b/10b encoded by an 8b/10b encoder 318. A multiplexer block 320 selects from the outputs of 8b/10b encoder 318 and scan line buffer 304 depending on the current operating mode of video/SONET interface 104.

Figure 4:
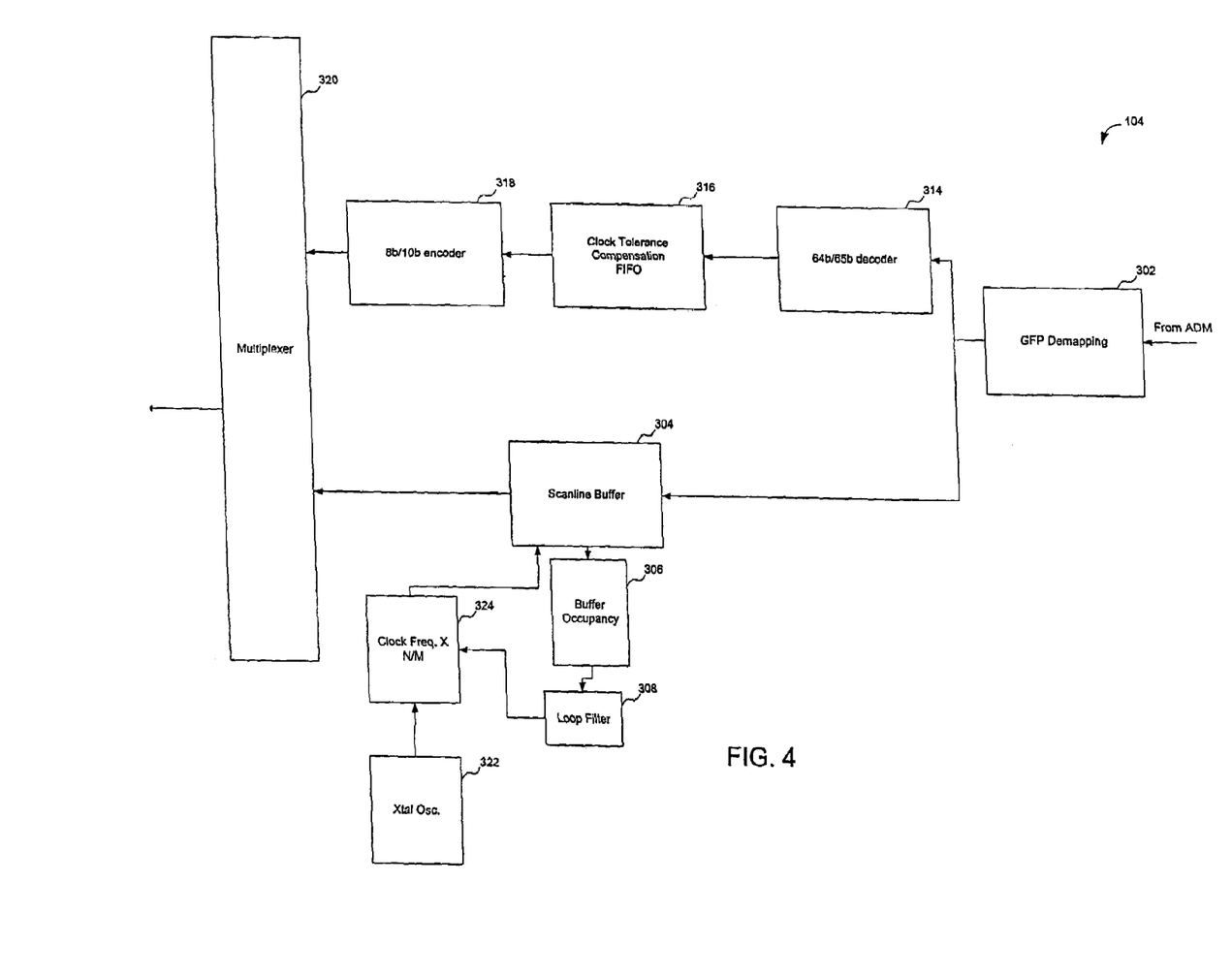
FIG. 4 depicts the receive side of a digital video interface according to an alternative embodiment of the present invention.

FIG. 4 depicts the receive section of video/SONET interface 104 according to an alternative embodiment of the present invention. The implementation depicted in FIG. 4 is similar to that of FIG. 3 except that the serial video data clock recovery loop is modified to take advantage of functionality available within commercially available serializers/deserializer (SERDES) chips. In FIG. 4, the output clock of scan line buffer 304 is generated by a crystal oscillator 322. The output of loop filter 308 rather than controlling the frequency of an NCO as in FIG. 3 instead adjusts a ratio N/M used to multiply the clock frequency of crystal oscillator 322. This multiplication is performed by a clock frequency multiplication block 324.

The various components of video/SONET interface 104 may be implemented in either hardware, software, or some combination thereof. For example, some or all of the above-described functions may be implemented by a processing device executing instructions stored or derived from a computer-readable medium such as, e.g., a CD-ROM, floppy disk, software distribution from the Internet, etc.

It is understood that the examples and embodiments that are described herein are for illustrative purposes only and that various modifications and changes in light thereof will be suggested to persons skilled in the art and are to be included within the spirit and purview of this application and scope of the appended claims and their full scope of equivalents.

What is claimed is:

1. A method comprising:
    receiving one or more video data streams at an interface configured to insert serial video data and packetized digital video into a network transport digital signal formatted in accordance with a hierarchical digital transmission standard by way of first and second processing chains respectively;
    processing via said first processing chain individual ones of said one or more video streams when individual ones of said one or more video streams comprise serial video data, wherein said processing comprises identifying horizontal scan lines in said serial video data stream, identifying vertical blanking intervals in said serial video data stream, and computing a payload header of N bytes for each data payload, where N is a provisionable value, including a two byte time stamp counter value and an associated two byte CRC value;
    encapsulating said horizontal scan lines and said payload header into generic framing procedure transparent mode (GFP-T) frames;
    mapping said GFP-T frames into said network transport digital signal in accordance with said hierarchical digital transmission standard; and
    inserting GFP-T idle frames into said network transport digital signal during said identified vertical blanking intervals.

2. The method of claim 1 wherein said serial video data stream comprises an ANSI/SMPTE 259M-1997 serial video data stream.

3. The method of claim 1 wherein mapping comprises:
    mapping said GFP-T frames into a VC-3 6v virtual concatenation.

4. The method of claim 1 wherein mapping comprises:
    mapping said GFP-T frames into a VT3-6v virtual concatenation.

5. The method of claim 1 wherein identifying said vertical blanking intervals is based on end of active video (EAV) and start of active video (SAV) framing bytes, and wherein said processing further comprises extracting EAV and SAV bytes from said horizontal scan lines.

6. The method of claim 1 wherein said payload header is 4 bytes in length and includes said time stamp counter value and associated CRC value.

7. The method of claim 1, further comprising processing via said second processing chain individual ones of said one or more video streams when individual ones of said one or more video streams comprise packetized digital video, wherein processing via said second processing chain further comprises:
    removing 8b/10b encoding from said packetized digital video;
    encoding said packetized digital video into 64b/65b superblocks; and
    encapsulating said superblocks into GFP-T frames.

8. The method of claim 7, further comprising multiplexing said superblocks with said horizontal scan lines prior to encapsulation based on a mode of said interface.

9. A method comprising:
    receiving at an interface, a network transport digital signal formatted in accordance with a hierarchical digital transmission standard comprising generic framing procedure transparent mode (GFP-T) frames that encapsulate one or more video streams, wherein said one or more video streams comprise at least one serial video data stream, packetized digital video, and idle GFP-T frames that identify vertical blanking intervals in said one or more video streams;
    demapping GFP-T frames from a signal formatted in accordance with said hierarchical digital transmission standard;
    deencapsulating said GFP-T frames to obtain payload headers and data payloads therein, and when said GFP-T frames comprise serial video data then removing idle GFP-T frames and extracting horizontal scan lines of said serial video data stream from said data payloads;
    buffering said horizontal scan lines in a buffer; and
    recovering clock timing of said serial video data stream based on said horizontal scan lines from time-stamp counter values in said payload headers.

10. The method of claim 9 wherein recovering clock timing comprises:
    reading data out of said buffer in accordance with a locally generated clock; and varying frequency of said locally generated clock in accordance with occupancy of said buffer.

11. The method of claim 9 wherein said serial video data stream comprises an ANSI/SMPTE 259M-1997 serial video data stream.

12. The method of claim 9 wherein demapping comprises:
demapping said GFP-T frames from a VC-3-6v virtual concatenation.

13. The method of claim 9 wherein demapping comprises:
demapping said GFP-T frames from a VT3-6v virtual concatenation.

14. The method of claim 9 wherein extracting further comprises generating end of active video (EAV) and start of active video (SAV) framing bytes if said EAV and SAV framing bytes were previously removed and inserting said EAV and SAV framing bytes into said data payloads.

15. The method of claim 9 wherein said payload headers are 4 bytes in length and include said time stamp counter values.

16. The method of claim 9, further comprising removing 64b/65b encoding from said deencapsulated data payloads that comprise GFP-T superblocks to obtain decoded data, buffering said decoded data, and 8b/10b encoding said decoded data when said GFP-T frames comprise packetized digital video.

17. The method of claim 16, further comprising multiplexing said 8b/10b encoded data with said horizontal scan lines based on a mode of said interface.

18. An apparatus comprising:
a scan line delineation block configured to segment a serial video data stream into a sequence of horizontal scan lines to form data payloads and compute a payload header of N bytes for each data payload, where N is a provisionable value, said payload header including a time stamp counter value and an associated CRC value;
a mapper configured to identify vertical blanking intervals in said serial video data stream, encapsulate said data payloads and corresponding payload headers into generic framing procedure transparent mode (GFP-T) frames, map said GFP-T frames into a digital signal in accordance with said hierarchical digital transmission standard, and insert idle GFP-T frames into said digital signal during said identified vertical blanking intervals.

19. The apparatus of claim 18 wherein said mapper is configured to map said GFP-T frames into a VC-3-6v virtual concatenation.

20. The apparatus of claim 18 wherein said mapper is configured to map said GFP-T frames into a VT3-6v virtual concatenation.

21. The apparatus of claim 18 wherein said serial video data stream comprises an ANSI/SMPTE 259M-1997 serial video data stream.

22. The apparatus of claim 18 wherein said scan line delineation block further removes End of Active Video (EAV) and Start of Active Video (SAV) bytes from said sequence of horizontal scan lines.

23. The apparatus of claim 18 wherein said scan line delineation block is configured to compute said payload header comprising 4 bytes in length and including said time stamp counter value and said associated CRC value.

24. The apparatus of claim 18, further comprising:
a decoder configured to remove 8b/10b encoding from said packetized digital video; and
an encoder configured to encode said decoded packetized digital video into 64b/65b superblocks,
wherein said mapper is configured to encapsulate said superblocks into GFP-T frames.

25. The apparatus of claim 24, further comprising a multiplexer configured to multiplex said superblocks with said horizontal scan lines prior to encapsulation based on a mode of said interface.

26. An apparatus comprising:
a demapper configured to remove idle generic framing procedure transparent mode (GFP-T) frames from a network digital signal, demap GFP-T frames from said network digital signal, deencapsulate said GFP-T frames to obtain data payloads and payload headers therein, and extract horizontal scan lines of a serial video data stream from said data payloads;
a buffer configured to store said extracted horizontal scan lines, said serial video data stream being clocked out of said buffer in accordance with said timing recovered from time-stamp counter values in said payload headers; and
a clock recovery system configured to recover timing of said serial video stream.

27. The apparatus of claim 26 wherein said clock recovery system comprises:
a buffer occupancy measurement block that measures occupancy of said buffer, said timing being adjusted in accordance with said measured occupancy.

28. The apparatus of claim 26 wherein said demapper is configured to demap said serial video data stream which comprises an ANSI/SMPTE 259M-1997 serial video data stream.

29. The apparatus of claim 26 wherein said demapper is configured to demap said GFP packets from a VC-3-6v virtual concatenation.

30. The apparatus of claim 26 wherein said demapper is configured to demap said GFP packets from a VT3-6v virtual concatenation.

31. The apparatus of claim 26 wherein said demapper is further configured to insert End of Active Video (EAV) and Start of Active Video (SAV) bytes into said data payloads to form said horizontal scan lines.

32. The apparatus of claim 26, further comprising:
a decoder configured to remove 64b/65b encoding from deencapsulated data payloads comprising GFP-T superblocks to obtain decoded data;
a clock tolerance compensation FIFO configured to insert or drop comma characters in said decoded data; and
an encoder configured to 8b/10b encode said decoded data.

33. The apparatus of claim 32, further comprising a multiplexer configured to multiplex said 8b/10b encoded data with said serial video data stream being clocked out of said buffer based on a mode of said interface.

34. An apparatus comprising:
means for receiving one or more video data streams at an interface configured to insert serial digital video and packetized digital video into a network transport digital signal formatted in accordance with a hierarchical digital transmission standard by way of first and second processing chains respectively;
means for processing via said first processing chain individual ones of said one or more video streams when individual ones of said one or more video streams comprise serial digital video, wherein said means for processing via said first processing chain comprises:
means for identifying horizontal scan lines in said serial digital video;
means for identifying vertical blanking intervals in said serial digital video;
means for computing a payload header of N bytes for each data payload, where N is a provisionable value, including a two byte time stamp counter value and an associated two byte CRC value;

means for encapsulating said identified horizontal scan lines and said payload headers into generic framing procedure transparent mode (GFP-T) frames;

means for mapping said GFP-T frames into a network transport digital signal in accordance with said hierarchical digital transmission standard; and means for inserting GFP-T idle frames into said network transport digital signal during said identified vertical blanking intervals.

35. The apparatus of claim 34, further comprising means for processing via said second processing chain individual ones of said one or more video streams when individual ones of said one or more video streams comprise packetized digital video, wherein said means for processing via said second processing chain comprises:

means for removing 8b/10b encoding from said packetized digital video;

means for encoding said packetized digital video into 64b/65b superblocks; and means for encapsulating said superblocks into GFP-T frames.

36. The apparatus of claim 35, further comprising means for multiplexing said superblocks with said horizontal scan lines prior to encapsulation based on a mode of said interface.

37. An apparatus comprising:

means for receiving at an interface, a network transport digital signal formatted in accordance with a hierarchical digital transmission standard comprising generic framing procedure transparent mode (GFP-T) frames that encapsulate one or more video streams, wherein said one or more video streams comprise serial digital video, and/or packetized digital video, and idle GFP-T frames that identify vertical blanking intervals in said one or more video streams;

means for demapping said GFP-T frames from said network transport digital signal formatted in accordance with said hierarchical digital transmission standard;

means for deencapsulating said GFP-T frames to obtain payload headers and data payloads therein;

means for removing idle GFP-T frames from said serial digital video;

means for extracting horizontal scan lines of said serial video data stream from said data payloads;

means for buffering said horizontal scan lines in a buffer; and means for recovering clock timing of said serial video data stream based on said horizontal scan lines from timestamp counter values in said payload headers.

38. The apparatus of claim 37, and further comprising:

means for removing 64b/65b encoding from deencapsulated data payloads that comprise GFP-T superblocks to obtain decoded data;

means for buffering said decoded data; and means for 8b/10b encoding said decoded data.

39. The apparatus of claim 38, further comprising means for multiplexing said 8b/10b encoded data with said buffered horizontal scan lines based on a mode of said interface.

* * * * *

UNITED STATES PATENT AND TRADEMARK OFFICE
CERTIFICATE OF CORRECTION

PATENT NO. : 7,653,924 B1  Page 1 of 1
APPLICATION NO. : 10/676708
DATED : January 26, 2010
INVENTOR(S) : Deng et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1396 days.

Signed and Sealed this

Twenty-eighth Day of December, 2010

David J. Kappos
*Director of the United States Patent and Trademark Office*